United States Patent
Han et al.

(10) Patent No.: US 10,654,351 B2
(45) Date of Patent: May 19, 2020

(54) ROLL ROD FOR VEHICLE

(71) Applicants: HYUNDAI MOTOR COMPANY, Seoul (KR); KIA MOTORS CORPORATION, Seoul (KR)

(72) Inventors: Sang Hoon Han, Bucheon-si (KR); Ku Kyun Kwon, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 134 days.

(21) Appl. No.: 15/822,963

(22) Filed: Nov. 27, 2017

(65) Prior Publication Data
US 2019/0047394 A1 Feb. 14, 2019

(30) Foreign Application Priority Data

Aug. 9, 2017 (KR) .......................... 10-2017-0101008

(51) Int. Cl.
*B60K 5/12* (2006.01)
*B62D 21/11* (2006.01)

(52) U.S. Cl.
CPC .......... *B60K 5/1208* (2013.01); *B60K 5/1241* (2013.01); *B62D 21/11* (2013.01)

(58) Field of Classification Search
CPC ..... B60K 5/1208; B60K 5/1241; B62D 21/11
USPC .......................................................... 248/678
See application file for complete search history.

(56) References Cited

U.S. PATENT DOCUMENTS

| | | | | |
|---|---|---|---|---|
| 2007/0018367 | A1* | 1/2007 | Kamei | F16F 1/3863 267/140.12 |
| 2012/0133091 | A1* | 5/2012 | Kim | F16F 1/373 267/293 |
| 2013/0320181 | A1* | 12/2013 | Kamei | B60K 5/1241 248/548 |
| 2015/0204405 | A1* | 7/2015 | Shimada | F16F 1/3828 267/141.2 |
| 2015/0204406 | A1* | 7/2015 | Yoon | F16F 6/005 248/562 |

FOREIGN PATENT DOCUMENTS

KR 10-1734715 B1 5/2017

* cited by examiner

*Primary Examiner* — Darlene P Condra
(74) *Attorney, Agent, or Firm* — Morgan, Lewis & Bockius LLP

(57) ABSTRACT

A roll rod for a vehicle includes: a bracket including a front insulator, which is connected to a power train, installed on one end portion; and a rear insulator assembly installed on the other end portion of the bracket. The rear insulator assembly comprises a rear insulator disposed on an inner side of a rear mounting portion formed on the other end portion of the bracket, and a core penetrating the rear insulator and fastened to a vehicle body.

6 Claims, 6 Drawing Sheets

PRIOR ART

ROLL ROD FOR VEHICLE

CROSS-REFERENCE TO RELATED APPLICATION

This application claims the benefit of priority to Korean Patent Application No. 10-2017-0101008, filed on Aug. 9, 2017 in the Korean Intellectual Property Office, the entire content of which is incorporated herein by reference.

TECHNICAL FIELD

The present disclosure relates to a roll rod for a vehicle and more particularly, to a roll rod for a vehicle capable of enhancing an insulation rate against vibration noise and improving durability.

BACKGROUND

As one of the mounting elements for supporting a power train of a vehicle, a roll rod connecting the power train to a vehicle body is used; and the roll rod is interposed between the power train and the vehicle body to control the roll movement of the power train and to insulate the vibration noise.

Figure 8:
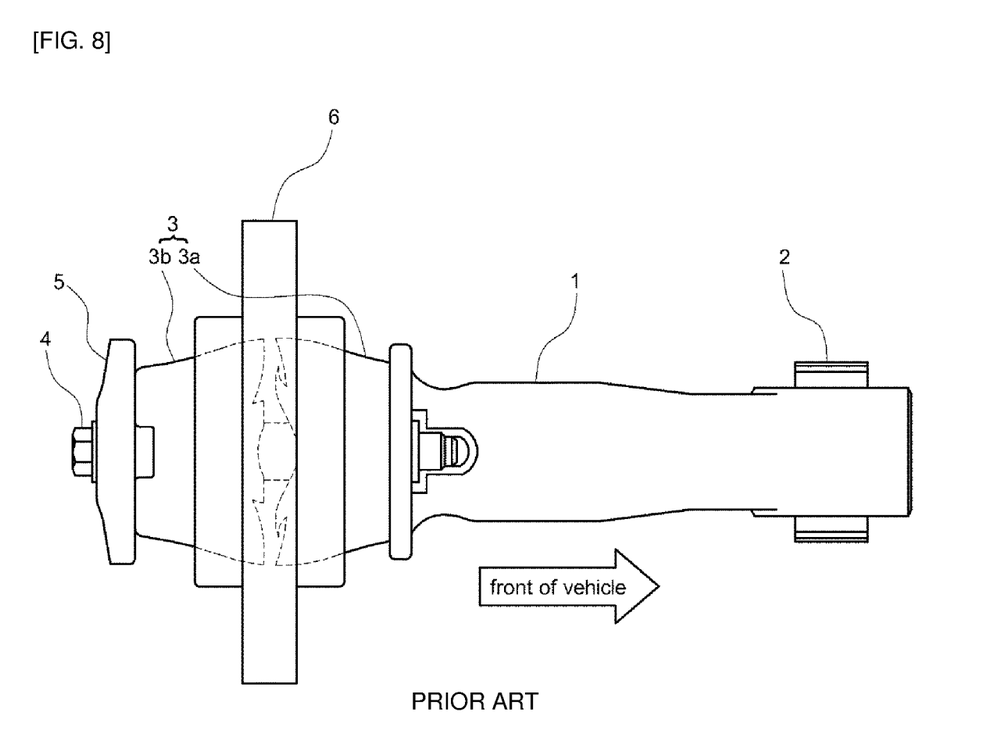
FIG. 8 is a view illustrating the roll rod for the vehicle according to the related art.

The accompanying FIG. 8 is a view illustrating a roll rod for a vehicle according to the related art.

As illustrated in FIG. 8, a conventional roll rod consists of a bridge bracket 1 interposed between a power train and a vehicle body; and a front insulator 2 and a rear insulator 3 formed on both end portions of the bridge bracket 1; and the front insulator 2 is connected to the power train and the rear insulator 3 is connected to the vehicle body through a case bracket 6 as the status supported between an end plate 5 and the bridge bracket 1 by a bolt member 4.

Such a conventional roll rod, in the case where the case bracket 6 is fixed to the vehicle body, upon forward driving of the vehicle, receives the load in the front direction and is pulled and in this case, a first rear insulator 3a, which is inserted into and installed on a front of the case bracket 6, of the rear insulator 3 is compressed; and upon backward driving of the vehicle, receives in the rear direction and is pulled and in this case, a second rear insulator 3b, which is inserted into and installed on a rear of the case bracket 6, of the rear insulator 3 is compressed.

The first and second rear insulators 3a, 3b, as the status not fixed to and inserted into an inner portion of the case bracket 6, are penetrated and supported by the bolt member fastened between the end plate 5 and the bridge bracket 1.

There has the problem that since the first and second rear insulators 3a, 3b are applied as the structure receiving only compression load, an interval (a gap) between one rear insulator, which does not receive the load in driving, and the case bracket 6 occurs in the front and rear direction of the vehicle and while it is restored at the moment that the load disappears, the shock occurs.

Further, there has the problem that for preventing the shock, in the case that the rear insulator 3 is inserted into the case bracket 6 as the status somewhat pre-compressed, in this case, a spring characteristic of the rear insulator 3 becomes increased and an insulation rate becomes very low.

Further, in the case that the rear insulator 3, as the status pre-compressed and inserted into the case bracket 6, receives the load to operate, since the pre-compressed amount of the rear insulator 3 is added to the compressed amount generated by the load, there occur the phenomenon that the rear insulator 3 sticks out the outside of the case bracket 6 and thereby, the phenomenon that the rear insulator 3 is inserted between the end plate 5 and the case bracket 6 to be destroyed, and the like, and thereby durability thereof very becomes disadvantageous.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure is proposed for solving the above problems, and an aspect of the present disclosure provides a roll rod for a vehicle capable of being newly configured to minimize an interval (a gap) generating between a rear insulator and a bracket according to the movement of the roll rod in driving and at the same time, to restrict deformation of the rear insulator and motion displacement in the front and rear direction of the vehicle according to the movement of the power train, thereby enhancing an insulation rate against vibration noise and improving durability.

Accordingly, an exemplary embodiment of the present disclosure includes a bracket including a front insulator, which is connected to a power train, installed on one end portion; and a rear insulator assembly installed on the other end portion of the bracket.

The rear insulator assembly comprises a rear insulator disposed on an inner side of a rear mounting portion formed on the other end portion of the bracket, and a core penetrating the rear insulator and fastened to a vehicle body.

According to the embodiment of the present disclosure, the inner side of the rear mounting portion protrudes to include a separation preventing rib, and a center portion of the rear insulator is formed with a separation preventing groove hooking the separation preventing rib.

The rear mounting portion may include openings on the left and right sides, and the rear insulator assembly may be disposed in the openings on the left and right sides of the rear mounting portion; and at least one side portion of side portions, which are positioned on both sides of the center portion of the rear insulator, may include an inclined portion tapered in the inserting direction with respect to the rear mounting portion. That is, at least one side portion of side portions of the rear insulator, which is formed on both sides of the center portion of the rear insulator, may include the inclined portion tapered toward an outside of the rear insulator.

Further, according to the embodiment of the present disclosure, the center portion of the rear insulator may include a stopper protruded to front and rear sides of the center portion to maintain a constant interval with the separation preventing rib; and the side portion of the rear insulator may include a void configured as an empty space on front and rear sides of the side portion.

In this case, a width in the front and rear direction of the void may be set to be larger than the interval between the stopper and the separation preventing rib, thereby restricting the motion displacement of the rear insulator by a double stopping method.

The roll rod for the vehicle according to an exemplary embodiment of the present disclosure may obtain the following effects.

1. Upon deformation of the rear insulator according to the movement of the roll rod, the motion displacement may be limited by the stopper and the void to thereby restrict the deformation of the rear insulator, thereby minimizing lifting between the bracket and the rear insulator, which occurs in the case that the load is applied to the roll rod and fundamentally preventing the shock, which occurs while the lifting is restored to disappear at the moment that the load applied to the roll rod is removed.

2. Accordingly, it is possible to minimize the pre-compression (the pre-compression before inserted into the bracket) of the rear insulator for preventing the lifting; eventually lowering the spring characteristic of the rear insulator to enhance the insulation rate against the vibration noise.

3. Further, it is possible to implement a double stopping function using the stopper and the void to restrict the motion displacement of the rear insulator step by step, thereby preventing rapid deformation of the rear insulator and enhancing the insulation rate of the rear insulator by occurrence of the gradual, flexible deformation.

Other aspects and embodiments of the present disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the present disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the present disclosure. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present disclosure, examples of which are illustrated in the accompanying drawings and described below. While the present disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the invention as defined by the appended claims.

In the whole description, it will be understood that when a component is referred to as being "comprising" any component, it does not exclude other components, but can further comprises the other components unless otherwise specified.

A roll rod for a vehicle according to an exemplary embodiment of the present disclosure supports a power train using an engine mount interposed between an engine and a vehicle body and a transmission mount interposed between a transmission and the vehicle body and the like, and is connected between the power train and the vehicle body (including a sub-frame) to control the roll movement of the power train and insulate vibration noise; and particularly, is newly configured to minimize an interval (a gap) generating between a rear insulator and a bracket in the case that the load is applied in driving and at the same time, to restrict deformation of the real insulator and motion displacement in the front and rear direction of the vehicle, thereby enhancing an insulation rate against vibration noise compared to the conventional roll rod and improving durability.

Figure 1:
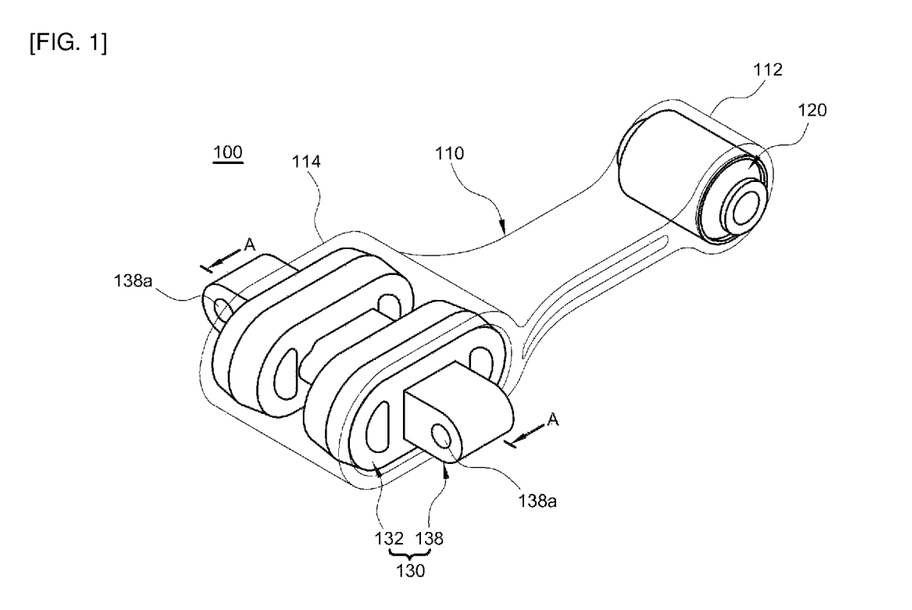
FIG. 1 is a combined perspective view illustrating a roll rod for a vehicle according to one embodiment of the present disclosure.
Figure 2:
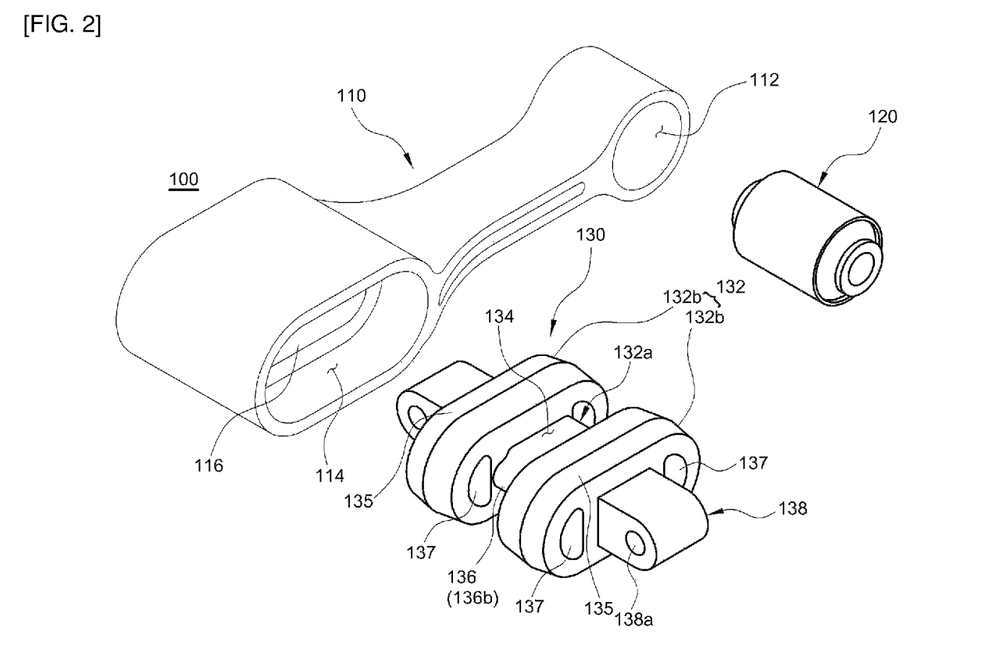
FIG. 2 is a partially exploded perspective view illustrating the roll rod for the vehicle according to one embodiment of the present disclosure.
Figure 3:
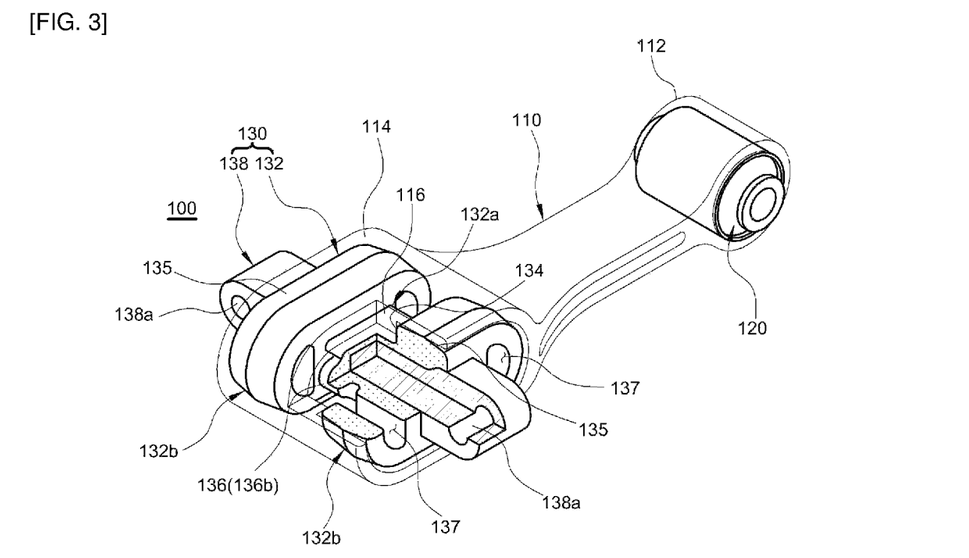
FIG. 3 is a partially cut-off perspective view illustrating the roll rod for the vehicle according to one embodiment of the present disclosure.

As illustrated in FIGS. 1 to 3, a roll rod according to an exemplary embodiment of the present disclosure includes a bracket 110 interposed between a power train and a vehicle body; a bush type front insulator 120 installed on both end portions of the bracket 110; and a rear insulator assembly 130.

The bracket 110 is interposed between the power train and the vehicle body to be longitudinally positioned in the front and rear direction of the vehicle; includes a front mounting portion 112 having a space with a front insulator 120 installed on one end portion (a front end portion) in the longitudinal direction thereof and a rear mounting portion 114 having a space with the rear insulator 132 installed on the other end portion (a rear end portion) in the longitudinal direction thereof.

In this case, the front mounting portion 112 and the rear mounting portion 114 may be formed as a cylindrical shape with left and right sides opened; and specifically, the front mounting portion 112 may be formed a cylindrical shape having a circle-shaped cross section and the rear mounting portion 114 may be formed as an oval-shaped cross section.

The front insulator 120 is fixed as a component inserted into the front mounting portion 112 and at the same time, fastened to the power train, and insulates the vibration delivered from the power train to operate the bracket 110.

The front insulator 120 obtains and installs a fastening force with respect to the front mounting portion 112 using an outer pipe and the like; and since the installed structure of the front insulator 120 applies the same structure as the related art, the detailed description thereof will be omitted.

The rear insulator assembly 130 includes the rear insulator 132 fixed as a component inserted into an inner side of the rear mounting portion 114 and a core 138 fixed as a component inserted into an inner side of the rear insulator 132 and fastened to the vehicle body.

In the case that the rear insulator 132 is made of an elastic material that is compressible or restorable such as a rubber and the like for absorbing the load applied in driving, and in the case that it is forcibly inserted into and installed in the inner side of the rear mounting portion 114, for preventing separation from the rear mounting portion 114, a center portion 132*a* in the left and right longitudinal direction of the rear insulator 132 is formed with a separation preventing groove 134 and a side portion 132*b* in the left and right longitudinal direction thereof is not formed with the separation preventing groove 134.

That is, the portion formed with the separation preventing groove 134 becomes the center portion 132*a* of the rear insulator 132 and the portion not formed with the separation preventing groove 134 becomes the side portion 132*b* of the rear insulator 132; the side portion 132*b* is positioned on the left and right sides of the center portion 132*a*; and the left and right position direction of the side portion 132*b* becomes identical to the inserting direction of the rear insulator 132 with respect to the rear mounting portion 114 (referring to FIG. 2).

Herein, the left and right longitudinal direction of the rear insulator 132 is identical to the direction inserted in the case that the rear insulator 132 is installed on the rear mounting portion 114; is identical to the longitudinal direction (the position direction) of the core 138 fixed to the inner side of the rear insulator 132; and also becomes perpendicular to the longitudinal direction (the position direction) of the bracket 110. In this case, the core 138 is inserted and fixed as a component penetrating the rear insulator 132.

Figure 4:
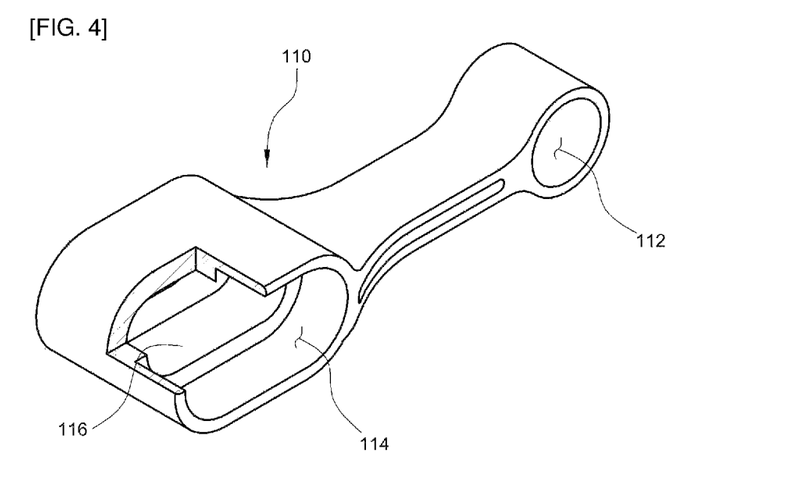
FIG. 4 is a partially cut-off perspective view illustrating a bracket of the roll rod for the vehicle according to one embodiment of the present disclosure.

As illustrated in FIGS. 3 and 4, in correspondence to the location of the separation preventing groove 134 of the rear insulator 132, a center portion of the rear mounting portion 114 is formed with a separation preventing rib 116 for preventing separation in the inserting direction of the rear insulator 132.

The separation preventing rib 116, in the case that the rear insulator 132 is forcibly press-fitted to the rear mounting portion 114, is hooked by the separation preventing groove 134 to hold the rear insulator 132 and in driving, prevents the rear insulator 132 from being separated from the rear mounting portion 114.

The separation preventing rib 116 may be protruded to and formed in the inner side surface of the rear mounting portion 114 at a constant height and formed as a ring shape seamlessly positioned along the circumferential direction of the rear mounting portion 114, but it is not limited to the shape.

And, the separation preventing groove 134 may be formed on the center portion 132*a* of the rear insulator 132 at a constant depth and formed as a ring shape seamlessly positioned in the circumferential direction of the center portion 132*a* and in this case, the depth of the separation preventing groove 134 is variable according to the location of the circumferential direction of the center portion 132*a*.

Figure 5:
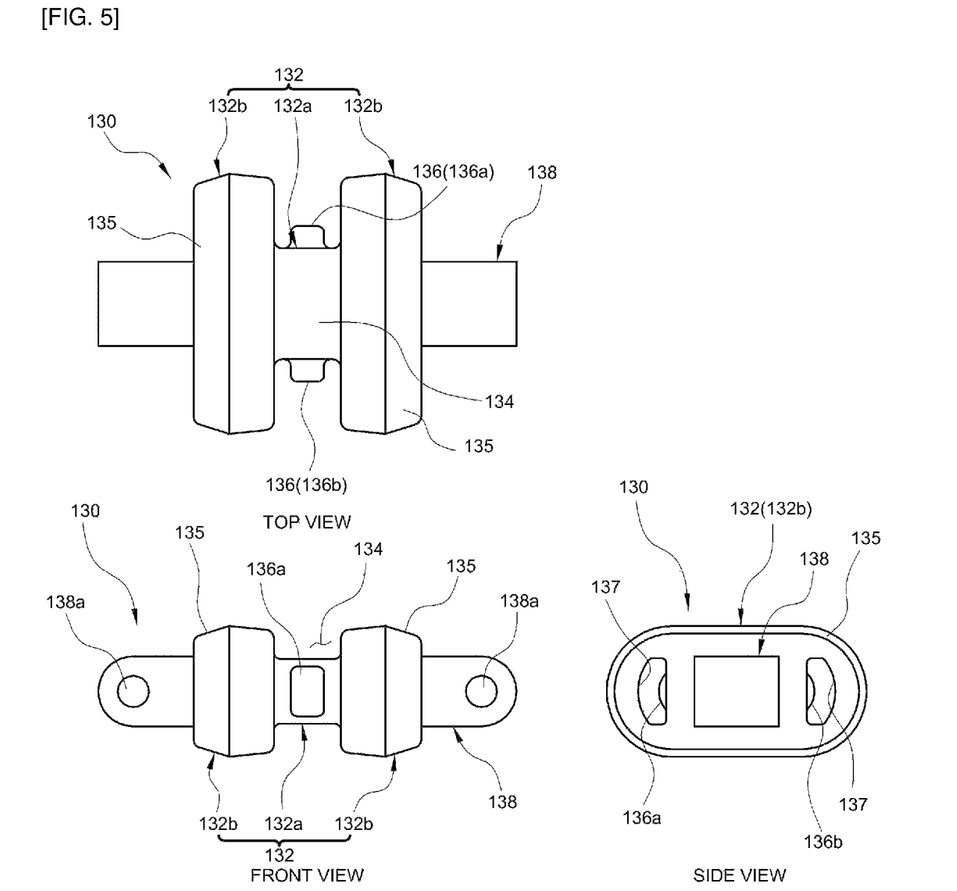
FIG. 5 is a view illustrating a rear insulator assembly of the roll rod for the vehicle as seen in several directions according to one embodiment of the present disclosure.

For example, as illustrated in FIG. 5, the separation preventing groove 134 may be formed on the up and down sides and the front and rear sides of the center portion 132*a*, respectively, at the same constant depth and at the same time, the depth at the up and down sides of the center portion 132*a* may be formed to be lower than that at the front and rear sides of the center portion 132*a*.

Figure 6:
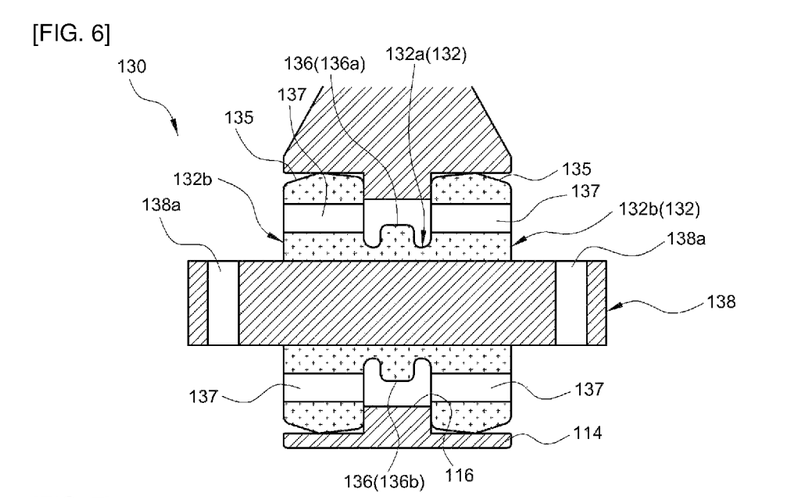
FIG. 6 is a cross-sectional view taken on line A-A of FIG. 1.

In the case that the rear insulator 132 is forcibly inserted into and installed in the rear mounting portion 114 with the separation preventing rib 116 formed, one side portion of the left and right sides of the side portion 132*b* crosses over and passes through the separation preventing rib 116 and is hooked by the separation preventing groove 134 interposed between the left and right sides of the side portion 132*b*, that is, one side portion of the left and right sides of the side portion 132*b* crosses over and passes through the separation preventing rib 116 and the other side portion does not cross over and hooks the separation preventing rib to thereby be fixed as a component inserted into the rear mounting portion 114 (referring to FIG. 6).

In this case, for the side portion 132*b* of the rear insulator 132 to cross over the separation preventing rib 116, as illustrated in FIGS. 5 and 6, the side portion 132*b* is prepared with an inclined portion 135 tapered (inclined) and formed toward an outside of the rear insulator 132.

The inclined portion 135 may be formed from the center portion of the side portion 132*b* to one edge portion (an outer edge portion opposite to the center portion of the rear insulator) based on the inserting direction of the rear insulator 132 with respect to the rear mounting portion 114 and formed as s shape with the width of the side portion 132*b* from the center portion of the side portion 132*b* to one edge portion gradually narrowed, thereby making the side portion 132*b* cross over the separation preventing rib 116 of the rear mounting portion 114.

In this case, the portion from the center portion of the side portion 132*b* to the other end edge portion (an inner edge portion connected with the center portion of the rear insulator) may be horizontally formed without inclination, but may be also inclinedly formed; and in case of being inclinedly formed, for the separation preventing rib 116 not to stick out the separation preventing groove 134, it is formed to be very gradually inclined at the inclined angle lower than that of the inclined portion 135.

And, in case of inserting the rear insulator 132 into the rear mounting portion 114, it is preferable to all form the inclined portion 135 on both sides of the side portion 132*b* of the rear insulator 132 to be easily inserted into any side of the left and right sides of the rear mounting portion 114, but it is also possible to form the inclined portion 135 only on any one side portion of both sides of the side portion 132*b*.

That is, at least one side portion of the side portion 132*b* positioned on both sides of the center portion 132*a* of the rear insulator 132 includes a taper-shaped inclined portion 135 and is tapered so that the width thereof gradually becomes small in the inserting direction with respect to the rear mounting portion 114.

In this case, the rear mounting portion 114 is formed as a cylindrical-shaped structure with the left and right sides in the axial direction thereof (the direction perpendicular to the longitudinal direction of the bracket 110) all opened to thereby insert the rear insulator assembly 130 into any side of the left and right sides of the rear mounting portion 114.

The axial direction of the rear mounting portion 114, in case of interposing the roll rod 100 between the vehicle body and the power train, becomes identical to the left and right direction of the vehicle.

Herein, the separation preventing structure using the separation preventing rib 116 and the separation preventing groove 134 may be applied even in case of installing the front insulator 120 on the front mounting portion 112; and in case of applying the separate preventing structure upon installation of the front insulator 120, for obtaining a fastening force of the front insulator 120 with respect to the front mounting portion 112, it is possible to remove a component such as an outer pipe and the like previously used between the front insulator 120 and the front mounting portion 112.

Further, the center portion 132a of the rear insulator 132 (hereinafter, used interchangeably as 'insulator center portion'), in which the separation preventing groove 134 is formed, includes a stopper 136 for restricting the motion displacement according to the deformation of the rear insulator 132 connected to the vehicle body through the core 138.

The stopper 136 is protruded to and formed on the front and rear sides of the insulator center portion 132a; and a front stopper 136a restricts the forward motion displacement of the rear insulator 132 and a rear stopper 136b restricts the rearward motion displacement of the rear insulator 132.

In this case, an edge end of the stopper 136 reaching the separation preventing rib 116 of the rear mounting portion 114 may be formed as a curved shape to minimize collision noise at the contact moment.

The rear insulator 132 has the deformation due to the load applied in driving and thereby the motion displacement in the front and rear direction of the vehicle due to the deformation and specifically, in the event that the core 138 integrally connected is fixed to the vehicle body, while receiving a force in the front of the vehicle to be compressed or receiving a force in the rear direction of the vehicle to be compressed according to the driving direction, compression and restoration are performed; and in this case, the stopper 136 may restrict the deformation of the rear insulator 132 and the motion displacement according to the movement of the bracket 110 in driving to eventually control the movement displacement of the roll rod 100 and the movement displacement of the power train.

And, each side portion 132b of the rear insulator 132 includes a void 137, 137' consisting of an empty space on the front and rear sides thereof.

Figure 7:
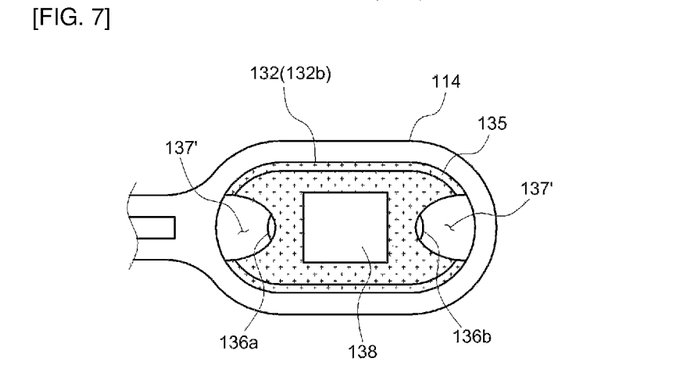
FIG. 7 is a side view illustrating the rear insulator assembly according to another embodiment of the present disclosure.

The void 137, 137' may be formed to guide occurrence of local deformation on the peripheral portion (the portion that is relatively thin and easily deformable of the side portions of the rear insulator) of the void 137, 137' upon deformation of the rear insulator according to the movement of the bracket 110; and as illustrated in FIG. 5, formed as a closed space on the front and rear sides of the rear insulator 132 (hereinafter, used interchangeably as 'insulator side portion') 132b or as illustrated in FIG. 7, formed as an opened space on the front and rear sides of the insulator side portion 132b.

The void 137, 137' together with the stopper 136 limits and restricts the motion displacement due to the deformation of the rear insulator 132; and in this case, for restricting the motion displacement by a double stopping method, the width in the front and rear direction of the void is set to be larger a constant value than an interval (an interval in the front and rear direction) between the stopper 136 and the separation preventing rib 116 of the rear mounting portion 114. In this case, as illustrated in FIG. 6, one side surface of the void 137, 137' is positioned on the same line as one side surface of the insulator center portion 132a.

That is, it is possible to form the width in the front and rear direction of the void 137, 137' to be larger than the interval in the front and rear direction between the stopper 136 and the separation preventing rib 116 by more than a constant value, thereby firstly restricting the motion displacement of the rear insulator 132 by the stopper 136 and then in the case that a larger load is applied, the peripheral portion of the void 137, 137' of the rear insulator 132 is further deformed and thereby the inner walls of the void 137, 137' come in contact with each other, secondly restricting the motion displacement of the rear insulator 132.

Thus, in case of applying the stopper 136 and the void 137, 137', upon deformation of the rear insulator 132 according to the movement of the roll rod, a first deformation occurs until before the stopper 136 reaches the separation preventing rib 116; a second deformation occurs in the event that the stopper 136 reaches the separation preventing rib 116; and a third deformation occurs in the event that the stopper 136 reaches the separation preventing rib 116 and at the same time, the inner walls of the void 137, 137' come in contact with each other.

Accordingly, the deformation of the rear insulator 132 proceeds through three steps to prevent rapid deformation of the rear insulator 132 and to occur gradual, flexible deformation; thereby it is possible to minimize lifting, which occurs between the bracket 110 and the rear insulator 132 in the case that the load is applied to the roll rod and to prevent the shock, which occurs while the lifting is restored to disappear at the moment that the load applied to the roll rod 100 is removed.

Further, in the case that the separation preventing rib 116 is not formed around the front inner wall surface and the rear inner wall surface of the rear mounting portion 114 contacting with the stopper 136, it is possible to form the width of the void 137, 137' in the front and rear direction to be larger than the interval in the front and rear direction between the inner wall surface of the rear mounting portion 114 and the stopper 136, thereby obtaining the effects above.

Meanwhile, the rear insulator assembly 130 consisting of the rear insulator 132 and the core 138 is integrally bonded and fixed with the rear insulator 132 and the core 138, as a structure with the core 138 inserted into the inner side of the rear insulator 132 upon curing of the rear insulator 132 and in this case, both end portions in the longitudinal direction of the core 138 protrude to the left and right sides of the rear insulator 132.

Both end portions of the core 138 protruded to the left and right sides of the rear insulator 132 are formed with a fastening hole 138a for fastening with the vehicle body and the fastening hole 138a is positioned in parallel with the longitudinal direction of the bracket 110.

The rear insulator assembly 130 consists of the left and right symmetric structure based on the center in the inserting direction with respect to the rear mounting portion 114; and the core 138, in the case that the roll rod 100 is interposed between the vehicle body and the power train, is lengthily positioned in the left and right direction of the vehicle.

The roll rod 100 according to an exemplary embodiment of the present disclosure configured as described above may obtain the following effects.

1. Upon deformation of the rear insulator 132 according to the movement of the roll rod 100, the motion displacement may be limited by the stopper 136 and the void 137, 137' to thereby restrict the deformation of the rear insulator 132, thereby minimizing lifting between the bracket 110 and the rear insulator 132, which occurs in the case that the load is applied to the roll rod 100 and fundamentally preventing the shock, which occurs while the lifting is restored to disappear at the moment that the load applied to the roll rod is removed.

2. Accordingly, it is possible to minimize the pre-compression (the pre-compression before inserted into the bracket 110) of the rear insulator 132 for preventing the lifting; eventually lowering the spring characteristic of the rear insulator 132 to enhance the insulation rate against the vibration noise.

3. Further, it is possible to implement a double stopping function using the stopper 136 and the void 137, 137' to restrict the motion displacement of the rear insulator 132 step by step, thereby preventing rapid deformation of the rear insulator 132 and enhancing the insulation rate of the rear insulator 132 by occurrence of the gradual, flexible deformation.

4. It is possible to prevent the phenomenon generating upon operation of the roll rod according to the related art (referring to FIG. 8), that is, the phenomenon where the rear insulator is inserted between the end plate and the case bracket and thereby suffer deterioration, and the like, thereby relatively improving durability.

5. It is possible to reduce the number of component compared to the roll rod according to the related art (referring to FIG. 8) and to save manufacturing costs and weight.

The disclosure has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A roll rod for a vehicle comprising:
a bracket including a front insulator, which is connected to a power train, installed on one end portion; and a rear insulator assembly installed on another end portion of the bracket,
wherein the rear insulator assembly comprises a rear insulator disposed on an inner side of a rear mounting portion defined on the another end portion of the bracket, and a core penetrating the rear insulator and fastened to a vehicle body,
wherein at least one side portion of side portions of the rear insulator, which are disposed on both sides of a center portion of the rear insulator, comprises an inclined portion tapered toward an outside of the rear insulator, and
wherein the at least one side portion comprises a void configured as an empty space on front and rear sides of the at least side portion.

2. The roll rod of claim 1, wherein the inner side of the rear mounting portion protrudes to include a separation preventing rib, and the center portion of the rear insulator has a separation preventing groove hooking the separation preventing rib.

3. The roll rod of claim 2, wherein the center portion of the rear insulator comprises a stopper protruding from front and rear sides of the center portion to maintain a constant interval with the separation preventing rib.

4. The roll rod of claim 3, wherein a width in a front and rear direction of the void is configured to be larger than the constant interval between the stopper and the separation preventing rib.

5. The roll rod of claim 1, wherein the rear mounting portion includes openings on left and right sides thereof, and the rear insulator assembly is disposed in the openings on the left and right sides of the rear mounting portion.

6. The roll rod of claim 1, comprising a fastening hole for fastening with the vehicle body on both end portions of the core protruding toward left and right sides of the rear insulator.

* * * * *